(12) United States Patent
Cheng

(10) Patent No.: US 8,662,107 B2
(45) Date of Patent: Mar. 4, 2014

(54) SWITCH DEVICE FOR WATER CONDUIT VALVE

(75) Inventor: Chi-Han Cheng, Taichung (TW)

(73) Assignee: Yuan-Mei Corp., Taichung (TW)

( * ) Notice: Subject to any disclaimer, the term of this patent is extended or adjusted under 35 U.S.C. 154(b) by 370 days.

(21) Appl. No.: 12/926,749

(22) Filed: Dec. 8, 2010

(65) Prior Publication Data

US 2012/0145934 A1    Jun. 14, 2012

(51) Int. Cl.
 *F16C 3/00* (2006.01)

(52) U.S. Cl.
 USPC .............. 137/599.05; 137/551; 137/601.14; 251/30.04; 251/129.03; 251/129.15; 251/286

(58) Field of Classification Search
 USPC .............. 137/551, 599.01, 599.05, 601.14; 251/30.03, 30.04, 129.03, 129.15, 284, 251/286
 See application file for complete search history.

(56) References Cited

U.S. PATENT DOCUMENTS

| | | | | |
|---|---|---|---|---|
| 3,476,146 | A * | 11/1969 | Dolter | 137/601.13 |
| 4,093,180 | A * | 6/1978 | Strabala | 251/248 |
| 5,004,012 | A * | 4/1991 | Bratten | 137/560 |
| 5,083,546 | A * | 1/1992 | Detweiler et al. | 123/520 |
| 5,269,344 | A * | 12/1993 | McHugh | 137/557 |
| 6,453,936 | B1 * | 9/2002 | Frank et al. | 137/315.03 |
| 6,899,128 | B2 * | 5/2005 | Oh | 137/556 |
| 2004/0187934 | A1 * | 9/2004 | Hwang | 137/601.14 |
| 2005/0252557 | A1 * | 11/2005 | Kabu et al. | 137/599.01 |

* cited by examiner

*Primary Examiner* — Craig Schneider
*Assistant Examiner* — Jessica Cahill
(74) *Attorney, Agent, or Firm* — Raymond Y. Chan; David and Raymond Patent Firm

(57) ABSTRACT

A switch device for water conduit valve comprises a valve body having a water inflow passage bifurcated to form more than one water outflow passage, a first water inlet and a second water inlet disposed between the water inflow passage and the water outflow passage, a magnetic valve switch device connected to the first water inlet and a manual control switch device connected to the second water inlet to provide a user to freely select controlling water flow that is introduced into the water outflow passage from the first water inlet or the second water inlet through any switch device.

11 Claims, 19 Drawing Sheets

SWITCH DEVICE FOR WATER CONDUIT VALVE

FIELD OF THE INVENTION

The present invention relates to a switch device for water conduit valve, and more particularly to an innovative technique, in which a valve is simultaneously provided with a magnetic control switch device and a manual control switch device between its water inflow passage and a water outflow passage, that is provided to freely select operating which switch device to introduce water flow into the water outflow passage from the water inflow passage.

BACKGROUND OF THE INVENTION

According to a conventional structure of disposing water inflow passage and a water outflow passage in a conventional valve body and disposing valve switches between the water inflow passage and the water outflow passage adopts a single operating manner as a main design, including a magnetic control switch and a manual control switch by searching publication literature references.

The related prior arts applies magnetic control technique in a switch device for water conduit valve, including U.S. published applications 20050184261, 20100019178, 20090224191, 20080216896, U.S. Pat. Nos. 7,296,593, 6,691,937, 6,688,577, 6,675,826, 6,619,612, 5,497,135, 6,073,904, 6,076,550, 7,637,475, 5,599,003, 5,503,362, 5,269,333, 5,145,145, 4,948,090, 4,934,651, 6,457,697, 5,738,138, 5,676,342, 7,703,740, 5,655,747, and 5,622,351, the technique features shown in the foregoing prior arts utilize a valve to partition pipes and water passages. The valve is controlled by a valve rod to show an opening or closing state. The valve rod is disposed to an end of a rod body. Another end of the rod body corresponding to the end of disposing the valve rod has a flexible element. The main functionality of the flexible element is to push the rod body to allow the valve rod to seal the valve. The rod body then is driven to displace to allow the valve rod of one end to eject from the valve. In the foregoing publication applications and patents, most structures are driven by magnetic control devices.

However, the defects commonly existing in the foregoing prior arts are that when the valve is opened, the moveable rod body moves toward a direction that is opposite to the pushing of the flexible element. A reverse damper generated by the flexible element that is compressed may cause shift phenomenon at the moving path for the rod body, resulting in non-smooth situation.

Moreover, the rod bodies utilized in the prior arts did not have magnetic function, and parts of disposing the valve are purely made of rubber. Consequently, the only power to drive the rod body is generated by the flexible element in order to push the end of the rod body to plug into the valve. Currently, there is no innovative design to be developed for breaking through the conventional bottleneck of such drawback.

Further, the related publication application and patents using manual control as the switch device for water conduit valve are frequently applied in a manual control ball valve for connecting pipes and allow the valve connected to the inside of the pipes to show opening or closing states by using manual twisting. The foregoing manual twisting is not good enough since it is merely taken as a single operating mode.

Accordingly, to overcome the foregoing shortcomings, the inventor(s) of the present invention based on years of experience in the related field to conduct extensive researches and experiments, and finally invented a control switch for water conduit valve.

SUMMARY OF THE INVENTION

A primary objective of the present invention is to provide a control switch for water conduit valve having manual control and electromagnetic control functions to select and operate.

To achieve the foregoing objective, the control switch for water conduit valve provided by the invention comprises valve body disposed with a water inlet, wherein the water inlet is bifurcated to form more than one water outflow passage, and a first water outlet and a first water inlet, and a second water outlet and a second water inlet are respectively disposed between the water inflow passage and each water outflow passage; and a first circular seat is extended from an external portion of the first water outlet, and a magnetic control switch device is connected to the first circular seat, and a first rubber ring is fit to the first water outlet and the first water inlet to cover the water outlet and the water inlet, and the first rubber ring has a piercing hole respectively located at a field of the first water outlet and a first valve located to the first water inlet to have the function of controlling the opening or closing of the first valve by regulating the magnetic control switch device; and a second circular seat is extended from an external portion of the second water outlet, and a manual control switch device is connected to the second circular seat, and a second rubber ring is fit to the second water inlet, and a second valve is axially formed at the second rubber ring to have the function of controlling the opening or closing of the second valve by regulating the manual control switch device.

Accordingly, at least one magnetic control switch device and a manual control switch device are disposed between the water inflow passage and the same water outflow passage to provide a user to randomly select and operate.

DETAILED DESCRIPTION OF THE PREFERRED EMBODIMENTS

Figure 1:
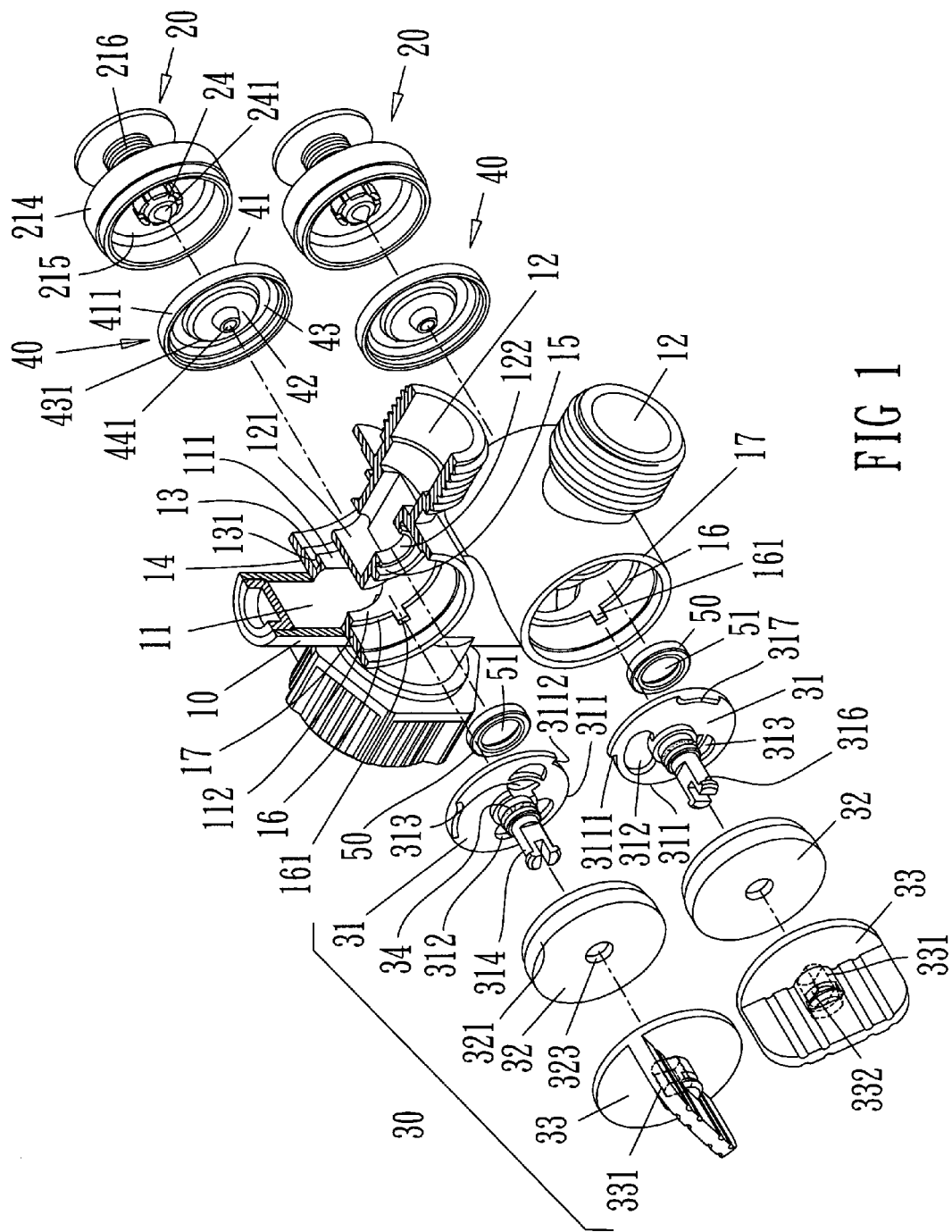
FIG. 1 is a decomposition drawing of a structure according to a preferred embodiment of the present invention.

Other features and advantages of the present invention will become apparent from the following description of the invention which refers to the accompanying drawings.

Referring FIG. 1 to FIG. 11 for a control switch for a water conduit valve in accordance with a preferred embodiment of the present invention is depicted and comprises a valve body 10 having a water inflow passage 11, wherein the water inflow passage 11 is bifurcated to form more than one water outflow passage 12. In the preferred embodiment, the water inflow passage 11 is bifurcated to form two water outflow passages 12. A magnetic valve switch device 20 and a manual control switch device 30 are disposed between the water inflow passage 11 and the same water outflow passage 12 and provided to a user to select controlling water flow that is introduced into the water outflow passage 12 from the water inflow passage 11 through the magnetic valve switch device 20 or controlling water flow that is introduced into the water outflow passage 12 through the manual control switch device 30 or controlling a maximum water flow that is introduced into water outflow passage through the magnetic valve switch device 20 and the manual control switch device 30.

Figure 2:
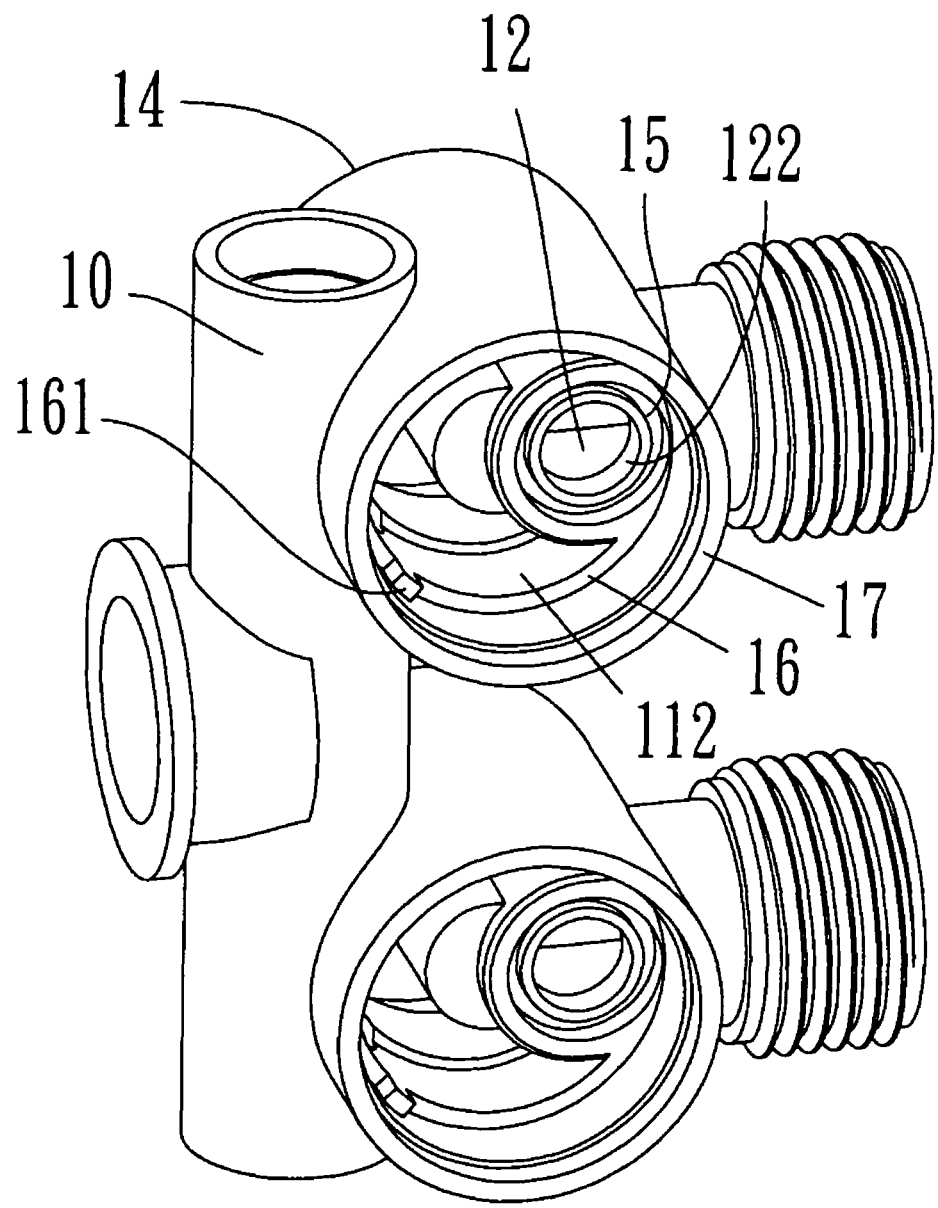
FIG. 2 is a three-dimensional drawing of a valve body of a structure at an another angle according to a preferred embodiment of the present invention.
Figure 14:
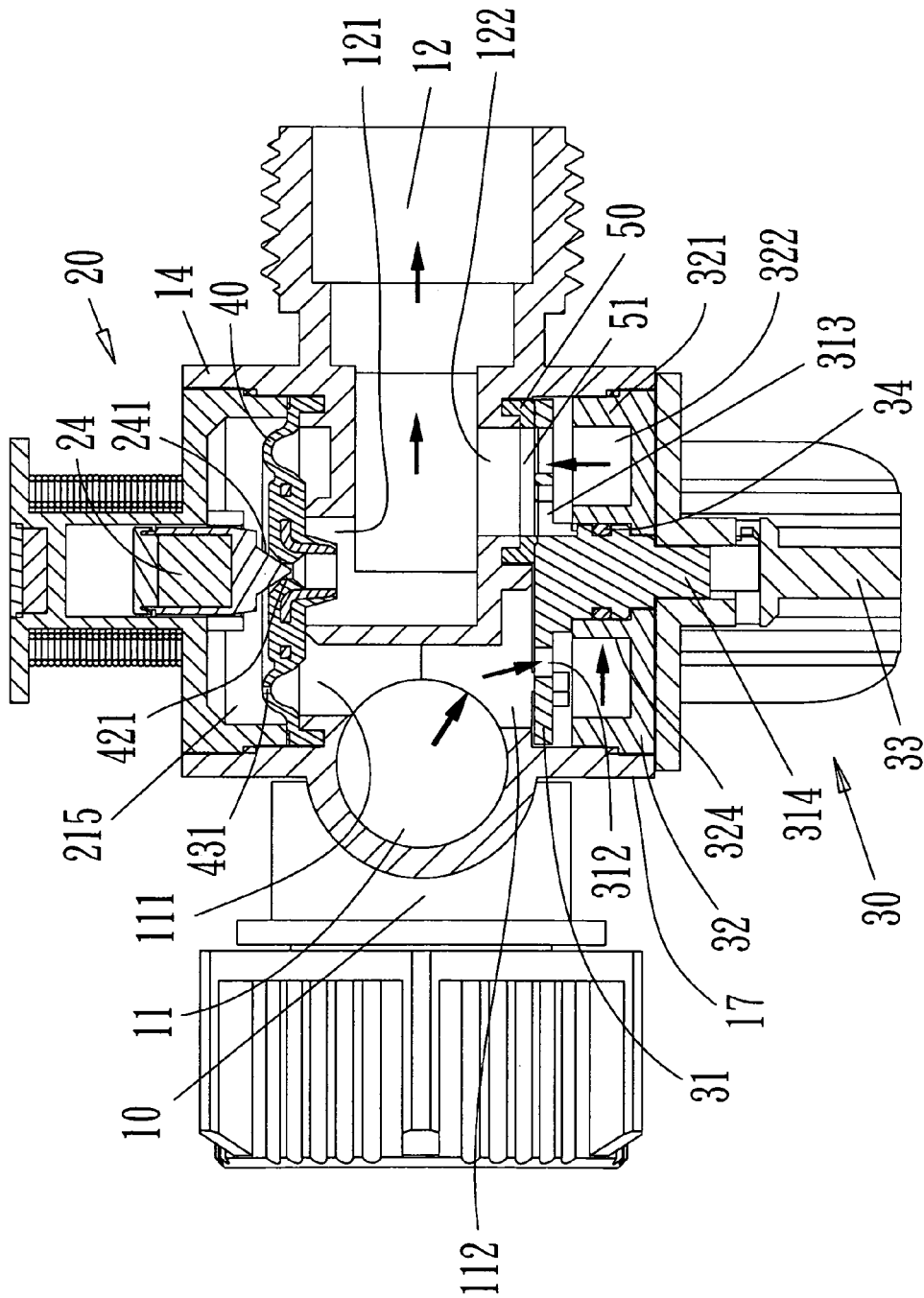
FIG. 14 is a B-B cross-sectional drawing according to FIG. 13.

The features of the structure of the invention are continuously depicted in detail by incorporating with each figure. As shown in FIG. 1, FIG. 2 and FIG. 14, a first water outlet 111 and a first water inlet 121 and a second water outlet 112 and a second water inlet 122 are respectively disposed between the water inflow passage 11 and each water outflow passage 12. The magnetic control switch device 20 is connected to the first water outlet 111 and a first water inlet 121. The manual control switch device 30 is connected the second water outlet 112 and the second water inlet 122.

The first water outlet 111 of the valve 10 is disposed to a periphery of the first water inlet 121, and a first inner baffle ring 13 and a first circular seat 14 that is outwardly protruded are formed at a periphery of the first water outlet 111. The first inner baffle ring 13 is covered with a first rubber ring 40. The magnetic control switch device 20 is connected in the first circular seat 14. A circular concave groove 131 is disposed along the ring surface of the first inner baffle ring 13 to have better limit effect after the corresponding end of the first rubber ring leans against the first inner baffle ring 13.

Figure 3:
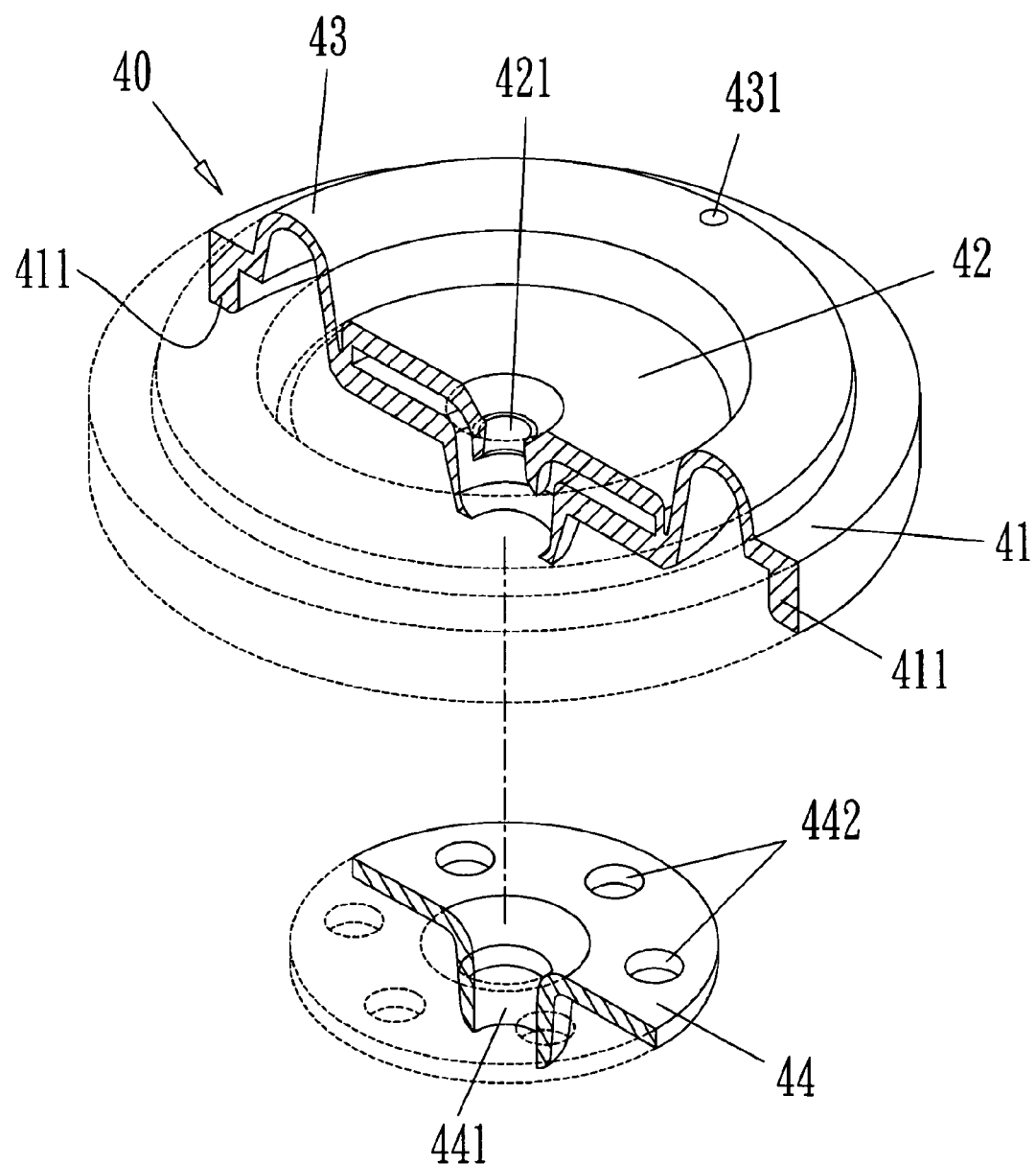
FIG. 3 is a decomposition drawing of a first rubber ring of a structure according to a preferred embodiment of the present invention.

The first rubber ring 40, as shown in FIG. 3, is made of rubber material having flexibility and comprises an external circular seat 41, an inner circular seat 42, and flexible film 43 connected between the external circular seat 41 and the inner circular seat 42. A bottom of the external circular seat 41 can be attached to the first inner baffle ring 13, and a circular protrusion portion 411 capable of being fit to the circular concave groove 131 of the first inner baffle ring 13 is extended from a periphery of the bottom of the external circular seat 41 to obtain better positioning effect. A bottom of the inner circular seat 42 can be attached to the first water inlet 121 to completely cover the first water inlet. A first valve 421 is disposed at the axial direction of the inner circular seat 42 and can communicate with the water outflow passage 12, and a metal plate 44 is combined to the inner circular seat 42. The flexible film 43 is located at a field of the first water outlet 111 (as shown in FIG. 14), and a piercing hole 431 is disposed to a predetermined place of the flexible film 43. A hole diameter of the piercing hole 431 is smaller than an inner diameter of the first valve 421. Accordingly, the first rubber ring 40 can completely cover the first water outlet 111 and the first water inlet 121. The metal plate 44 is encapsulated inside the inner circular seat 42. The metal plate 44 is made of a metal material capable of being attracted by magnetic force. A central hole 441 is disposed to the metal plate 44 at an axial direction and can align the first valve 421 of the inner circular seat 42. In addition, a plurality of through holes 442 is distributed at a periphery of the central hole 42 so that the metal plate 44 can be firmly encapsulated inside the inner circular seat 42 to form a whole.

Figure 4:
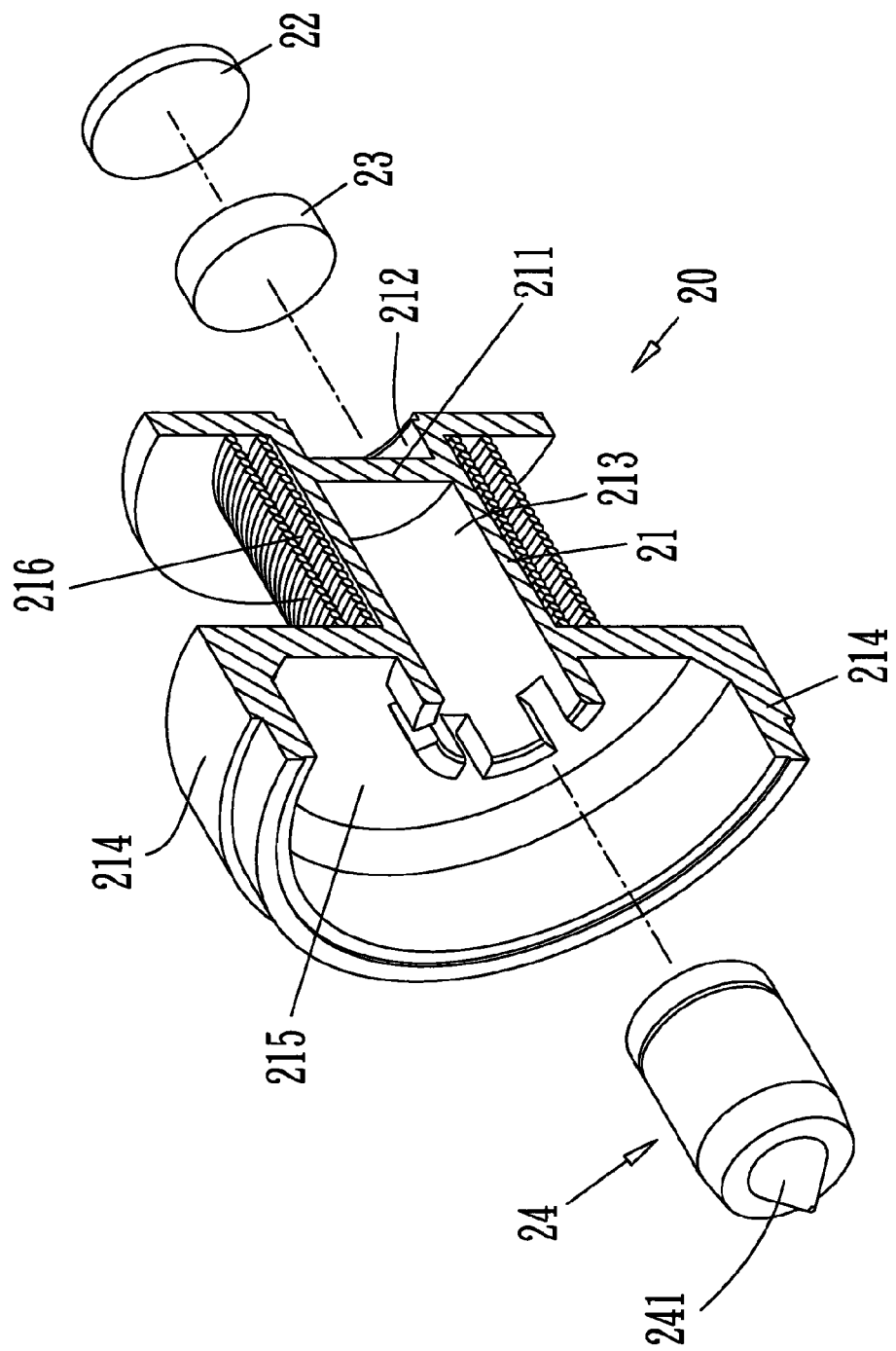
FIG. 4 is a decomposition drawing of a magnetic control switch device of a structure according to a preferred embodiment of the present invention.
Figure 5:
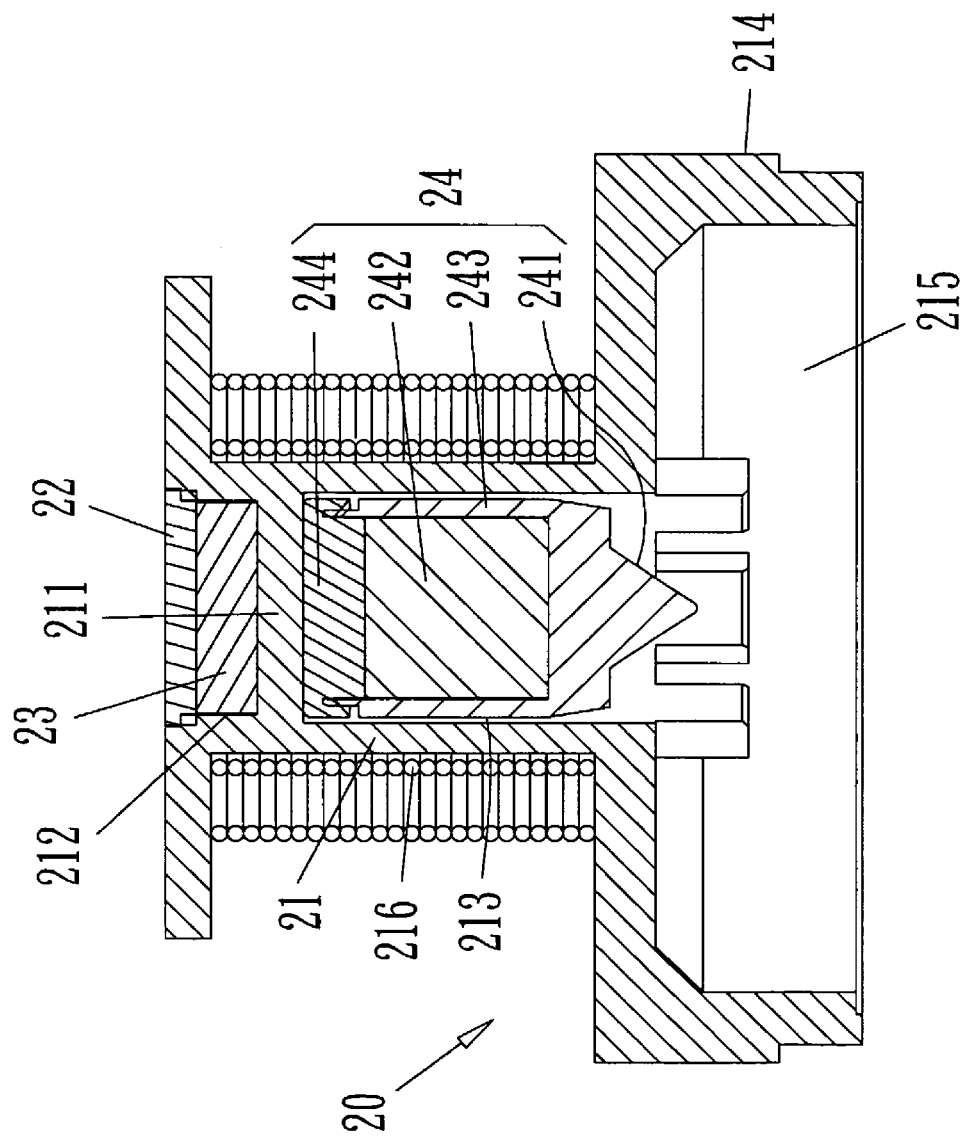
FIG. 5 is an assembled cross-sectional drawing according to FIG. 4.
Figure 6:
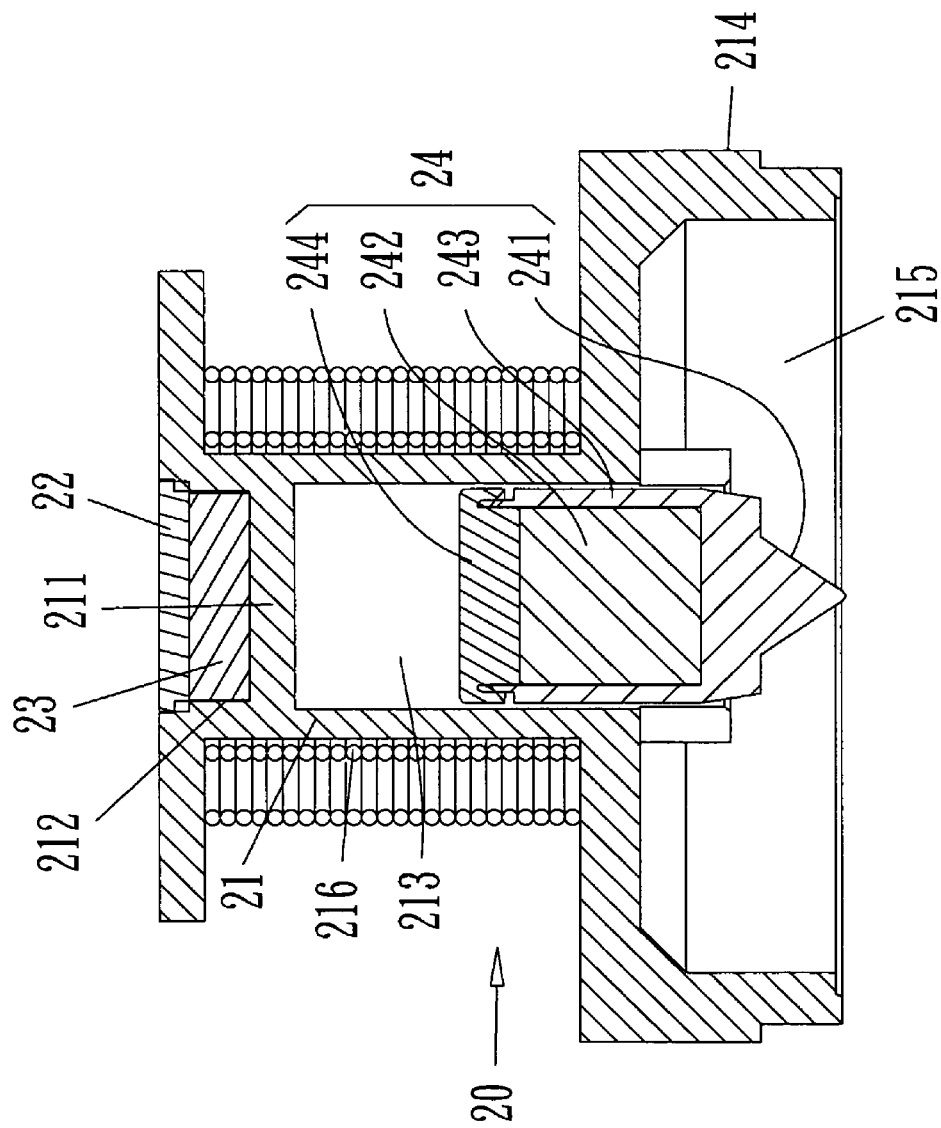
FIG. 6 is a schematic diagram of a movement according to FIG. 5.
Figure 7:
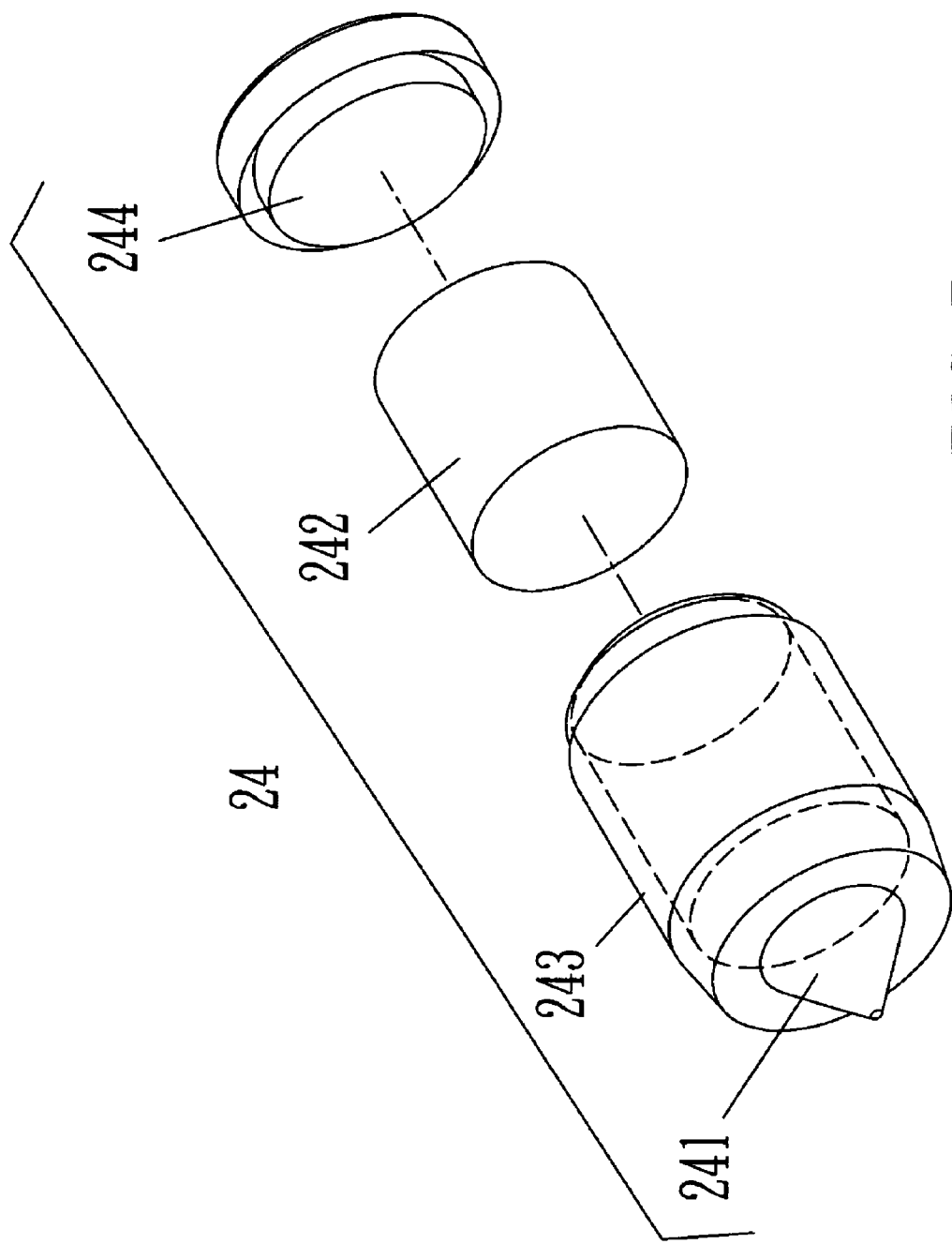
FIG. 7 is a decomposition drawing of a valve rod of a structure according to a preferred embodiment of the present invention.

As shown in FIG. 4, FIG. 5 and FIG. 6, the magnetic control switch device 20 comprises a pipe seat 21, an upper cover 22, a magnetic attraction element 23 and a valve rod 24.

A partition 211 is disposed inside the pipe seat 21 to partition an external pipe body space 212 having an opening end and an inner pipe body space 213. An external frame 214 is extended from a bottom of the inner pipe body space 213 of the pipe seat 21. An inner containing chamber 215 communicating with the inner pipe body space 213 is formed inside the external frame 214. The bottom of the external frame 214 can closely lean against an upper end surface of the external circular seat 41 of the first rubber ring 40, and an external portion of the pipe seat 21 is wound with an electromagnetic coil 216. The covering scope of the electromagnetic coil 216 covers the inner pipe body space 213 and the external pipe body space 212. The electromagnetic coil 216 is connected to a magnetic pole switch (not shown in the figure). The inside surrounded by the electromagnetic coil 216 can be controlled by the magnetic pole switch to generate a positive magnetic field or a negative magnetic field.

The upper cover 22 can close the opening end of the external pipe body space 212. The magnetic attraction element 23 is contained inside the external pipe body space 212 and shows the immovable state and made of a material capable of being attracted by a magnetic element.

The valve rod 24 is fit inside the inner pipe body space 213 and can be properly displaced and regulated. A valve plug 241 is disposed at a bottom of the valve rod 24 and can completely close the first valve 421 of the inner circular seat 42. The valve rod 24 can be made of a magnetic material. In the embodiment, the valve rod 24 comprises a magnetic element 242 capable of generating permanent magnetic force and a rubber sleeve pipe 243 and a sealing cap 244 for separately encapsulating external portions of the magnetic element 242. The valve plug 241 of the valve rod 24 is disposed to an external bottom of a closing end of the rubber sleeve pipe 243. An opening of the valve plug 241 is closed by the sealing cap 244. Accordingly, the magnetic element 242 may not be corroded by water.

Moreover, as shown in FIG. 1 and FIG. 2, the second water outlet 112 of the valve body 10 provided in the invention is disposed to a periphery of the second water inlet 122. A concave ring 15 is disposed to an external end of the second water inlet 122. The concave ring 15 surrounds the second water inlet 122 so that a second rubber ring 50 can be installed to the concave ring 15. A second valve 51 communicating with the second water inlet 122 is disposed to the second rubber ring 50 at an axial direction. In addition, the valve body 10 has a second inner baffle ring 16 formed at a periphery of the second water outlet 112. A limit block 161 is outwardly disposed to a predetermined place of the second inner baffle ring 16. A second circular seat 17 is outwardly protruded from a periphery of the second inner baffle ring 16 so that the manual control switch device 30 is connected inside the second circular seat 17.

Figure 8:
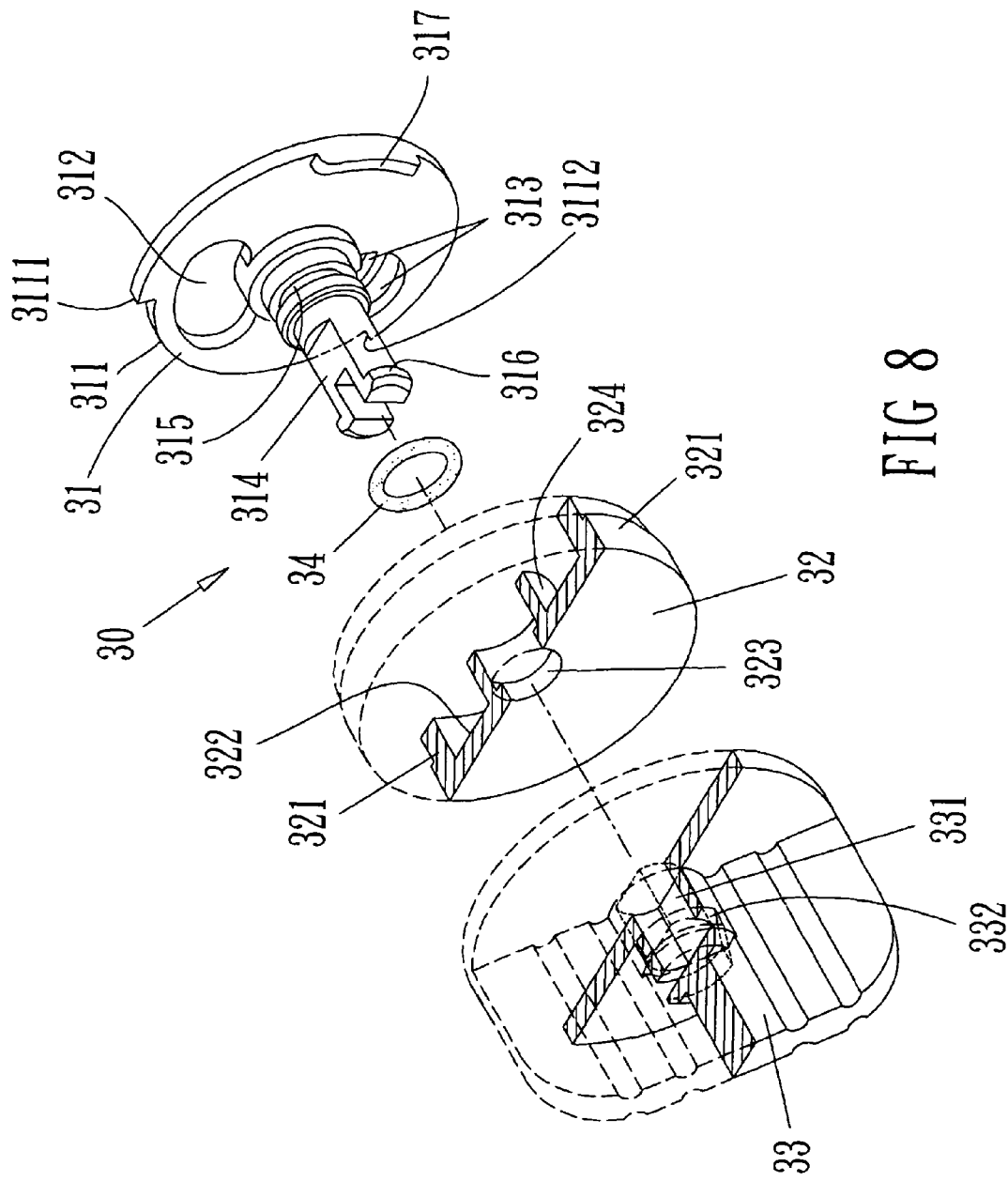
FIG. 8 is a decomposition drawing of a manual control switch device of a structure according to a preferred embodiment.
Figure 9:
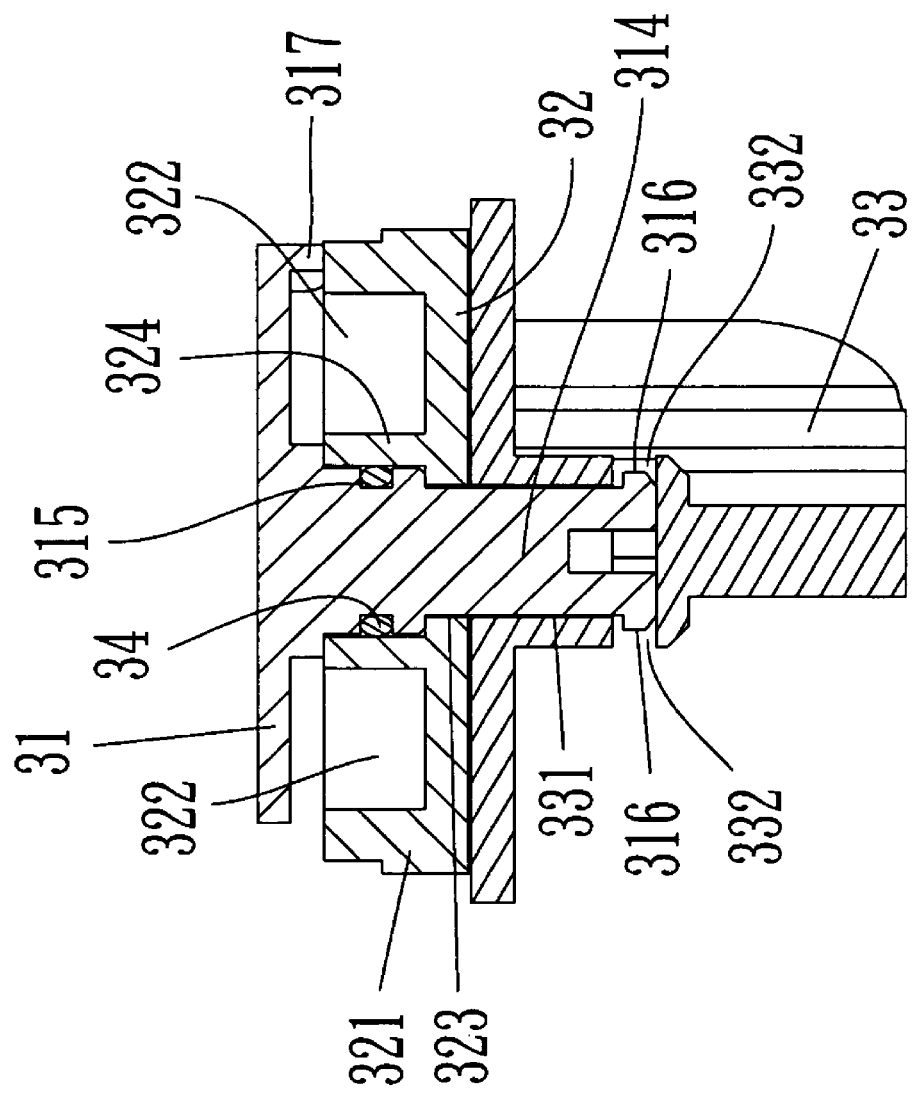
FIG. 9 is an assembled cross-sectional drawing according to FIG. 8.
Figure 10:
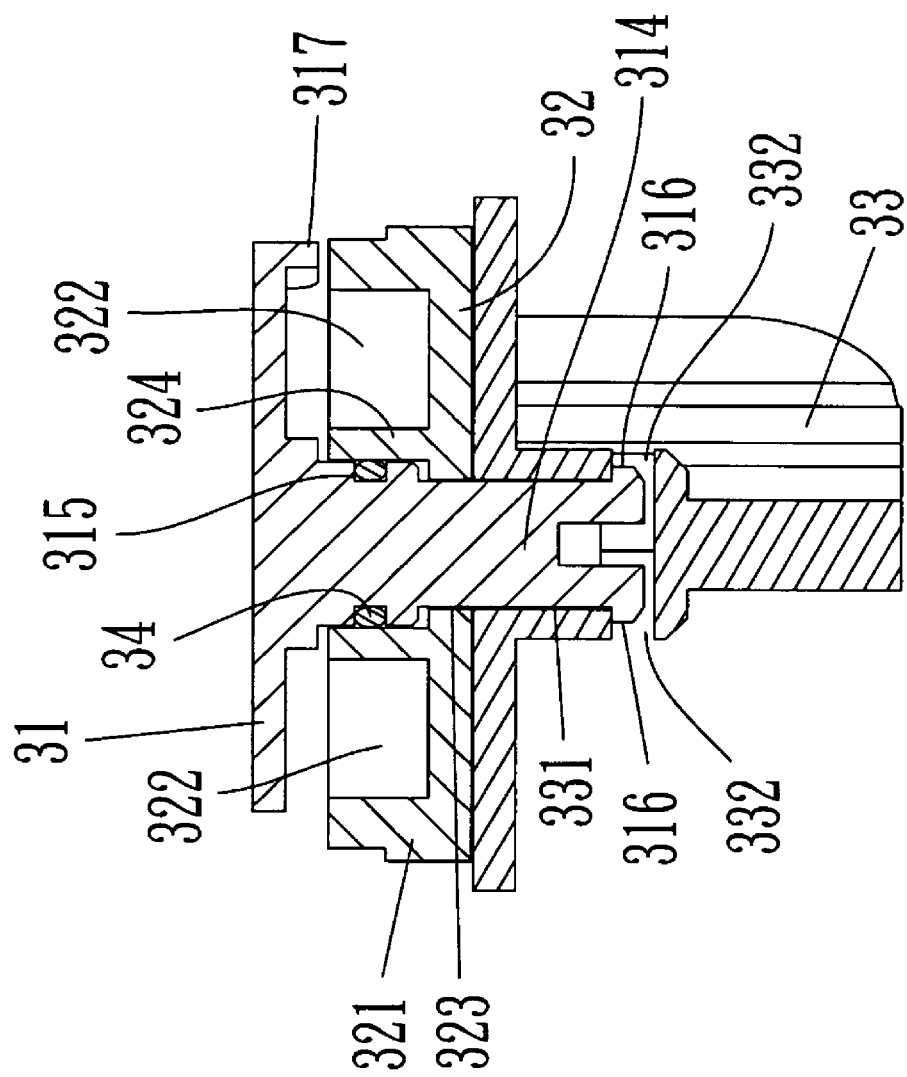
FIG. 10 is a schematic diagram of a movement according to FIG. 9.
Figure 11:
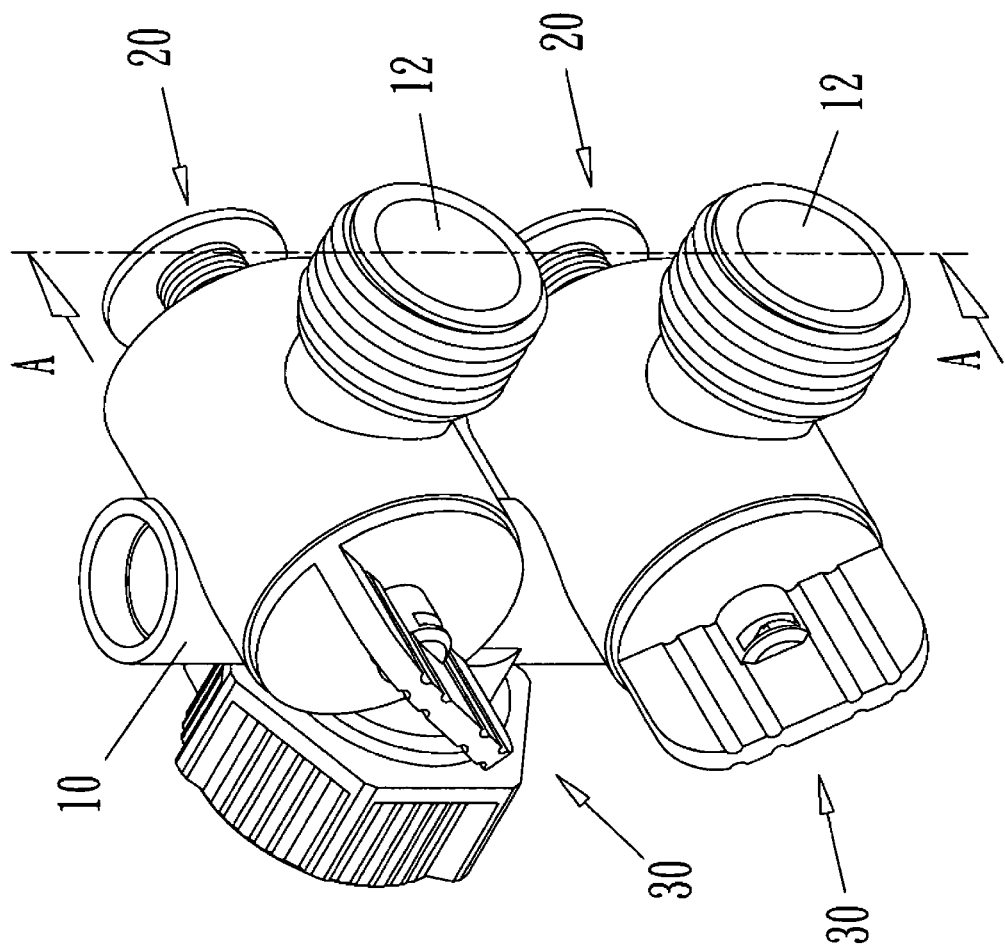
FIG. 11 is a three-dimensional drawing according to FIG. 1.

As shown in FIG. 8 to FIG. 10, the manual control switch device 30 comprises a rotary disc 31, an external cap 32 and a turning button 33.

One end of the rotary disc 31 can be attached to the corresponding end of the second inner baffle ring 16 located to the second water outlet 112 and the corresponding end of the second valve 51 of the second rubber ring 50 to close the second water outlet 112, the second water inlet 122 and the second valve 51. In addition, an inner concave arc 311 with a section is disposed along an edge at an external periphery of the rotary disc 31. A first piercing hole 312 and a second piercing hole 313 are disposed near a disc surface of the rotary disc 31. The second piercing hole 313 can be rotated and regulated to align or stagger the second valve 51 and the second water inlet 122. An axis cylinder 314 is axially disposed to the disc surface of the rotary disc 31. The axis cylinder 314 has an inner circular groove 315 near the rotary disc 31, and a water stop ring 34 is fit to the inner circular groove 315. A convex ring portion 316 is respectively formed at an external end of the axis cylinder 314. The axis cylinder 314 has a cross-section notch having outward opening axially disposed at the convex ring portion 316 so that the convex ring portion 216 has the fine adjustment function capable of being flexibly internal-shrunk. When the axis cylinder 314 is combined to the turning button 33, the convex ring portion 316 can stop the turning button 33 to have the function of preventing the turning button 33 from being quitted. The inner concave arc 311 is provided for containing the limit block 161 disposed to the second inner baffle ring 16. A first inner side end 3111 and a second inner side end 3112 are formed at the corresponding side of the inner concave arc 311 and provided for blocking and limiting the corresponding end surface of the limit block 161 so that the rotary disc 31 can be rotated and regulated within a predetermined angle range. Moreover, the rotary disc 31 has at least one convex seat 317 disposed toward the axis cylinder 314. The convex seat 317 in the embodiment is disposed near an external edge of the rotary disc 31 and shows a curved arc shape. The end surface of the convex seat 317 corresponding to the external cap 32 is provided for leaning and limiting the corresponding surface of the external cap 32.

The external cap 32 is provided for connecting the opening end of the second circular seat 17 of the valve body 10 and can close the opening end of the second circular seat 17. One end of the external cap 32 is provided with a circular frame 321 capable of being contained inside the second circular seat 17, and a containing chamber 322 is formed in the external cap 32. A bottom of the circular frame 321 is provided for leaning against and limiting the corresponding disc surface of the rotary disc 31. An axle hole 323 is axially disposed to the external cap 32 and passed by the axis cylinder 314. An inner frame ring 324, which corresponds to the circular frame 321, is protruded at the axle hole 323 of the external cap 32. An inner wall surface of the inner frame ring 324 can be in contact with an external ring end of the water stop ring 34 fit to the axis cylinder 314 to achieve water stop and leakage prevention functions.

An end of the turning button 33 is provided with a shape hole 331 that can be fit by an end of the axis cylinder 314 of the rotary disc 31 to generate a function of synchronous linkage. Symmetric holes 332 is preset at an end of the shape hole 331 to contain the convex ring portions 316 of the axis cylinder 314, and the axis cylinder 314 can be properly fine-adjusted and moved in the shape hole 331. After the axis cylinder 314 is fit in the shape hole 331 to achieve the positioning, the appearance shape capable of aligning the shape hole 331 is disposed at a section of the shape hole 331.

With the foregoing components, when the second piercing hole 313 is staggered the second valve 51 by manually rotating the turning button 33 to synchronously drive the rotary disc 31, the corresponding end surface of the rotary disc 31 can close the second valve 51 to show a water stop state. When the rotary disc 31 is rotated to the second piercing hole 313 to align the second valve 51, water flow can enter into the containing chamber 322 of the external cap 32 through the first piercing hole 312 from the second water outlet and then is introduced into the water outflow passage 12 through the second valve and the second water inlet 122 from the second piercing hole.

As shown in FIG. 8 to FIG. 10 and FIG. 15, after the second valve 51 of the second rubber ring 50 is closed by manually rotating the rotary disc 31, the rotary disc 31 can have a function of freely fine-adjustment due to the rotary disc 31 linked to the turning button 33. Accordingly, the rotary disc 31 can be pushed by the force of water pressure produced from water flow entering into the containing chamber 322 so that the rotary disc 31 can further lean against the second valve 51 to ensure the closing effect.

Moreover, as shown in FIG. 1 and FIG. 11 to FIG. 18, a three-dimensional drawing of an assembled switch device for water conduit valve and schematic diagrams of operating a magnetic control switch and a manual control switch device in accordance with the present invention are depicted.

Firstly, as shown in FIG. 1 and FIG. 11 to FIG. 13, the water outflow passage 12 is respectively bifurcated form an upper end and a lower end of the water inflow passage 11 of the valve body 10. The magnetic control switch device 20 disposed between the upper end of the water outflow passage 12 and the water inflow passage 11 shows a closed state while the manual control switch device 30 shows an opened state. The magnetic control switch device 20 disposed between the lower end of the water outflow passage 12 and the water inflow passage 11 shows an opened state while the manual control switch device 30 is regulated as a closed state.

Figure 12:
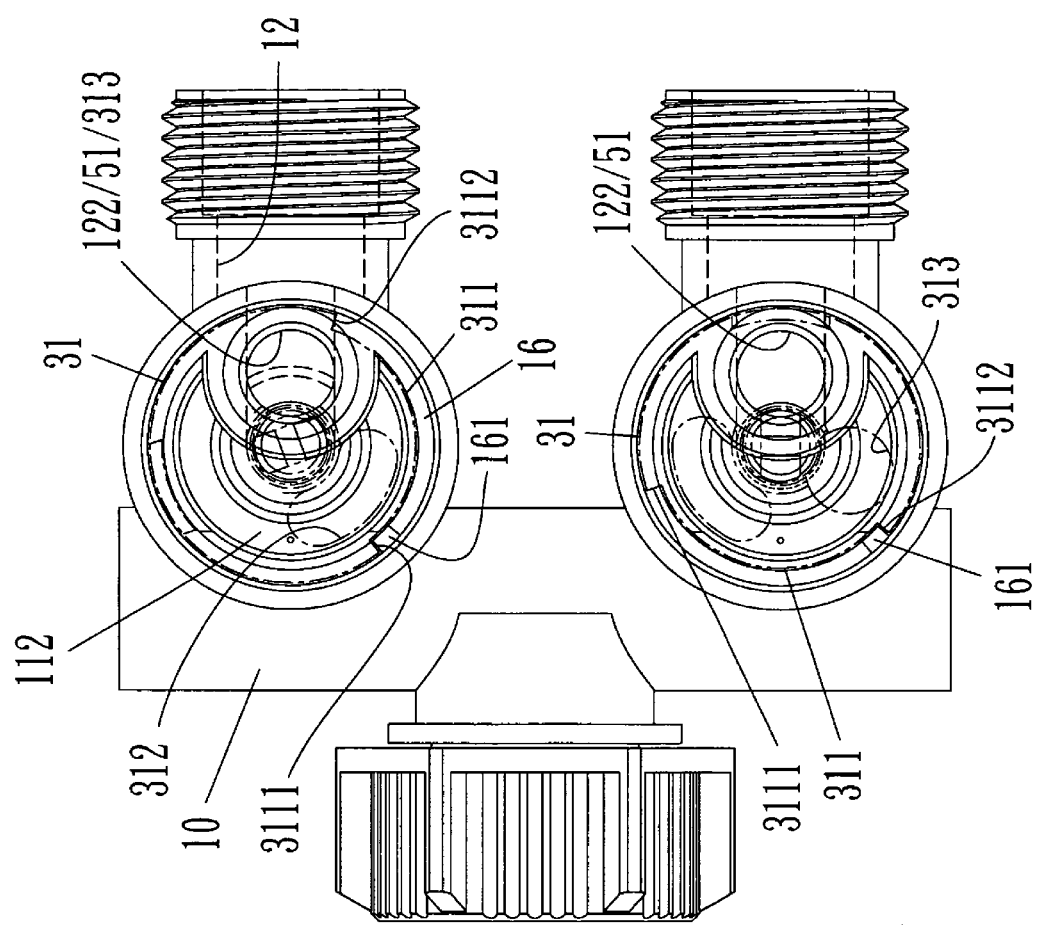
FIG. 12 is a front view drawing of a hidden rotary button and an external cap according to FIG. 11.
Figure 13:
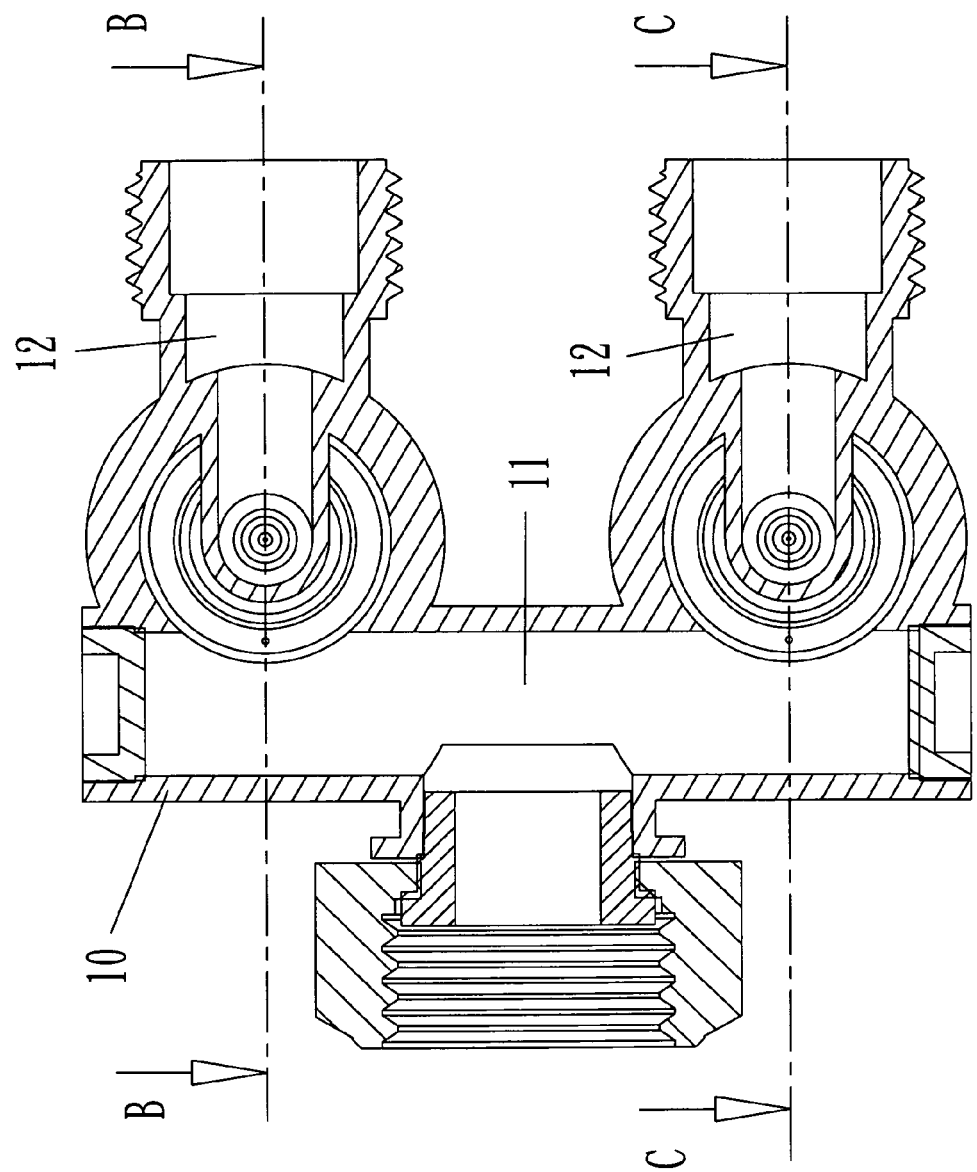
FIG. 13 is an A-A cross-sectional drawing according to FIG. 11.

Referring to FIG. 12 and FIG. 14, when the first water outlet 111 and the first water inlet 121 are completely closed by the first rubber ring 40, the moving of the valve rod 24 of the magnetic control switch 20 is regulated to drive the valve plug 241 of the valve rod 24 to close the first valve 421 of the first rubber ring 40. Water flow is not introduced into the water outflow passage through the first water inlet 121. A first inner end 3111 of the inner concave arc 311 of the manual control switch device 30 leans against the limit block 161 by regulating the turning button 33. In the meantime, the second piercing hole 313 of the rotary disc 31 aligns the second valve 51 of the second rubber ring 50 and the second water inlet 122 to guide the maximum water flow. The first piercing hole 312 of the rotary disc 31 is at the field covered by the second water outlet 112.

Accordingly, water flow is introduced from the second water outlet of the water inflow passage into the containing chamber 322 inside the circular frame 321 of the external cap 32 through the first piercing hole 312 of the rotary disc 31 and then is introduced from the containing chamber 322 into the water outflow passage through the second piercing hole 313, the second valve 51 and the second water inlet 122.

As shown in FIG. 12 and FIG. 15 to FIG. 18, when the turning button 33 is rotated to tow the rotary disc 31 to synchronously rotate, a second inner end 3112 of the inner concave arc 311 keeps near the limit block 161, the intersection field between the second valve 51 and the second piercing hole 313 becomes the small from the large field to regulate water flow introduced into the second water inlet 122 from the second valve 51. When the turning button 33 is rotated to a position that the second inner end 3112 is leaned against the limit block 161, the second valve 51 and the second piercing hole 311 of the rotary disc 31 will be in a staggered state, so that the second valve 51 can be completely closed by the rotary disc 31.

Figure 15:
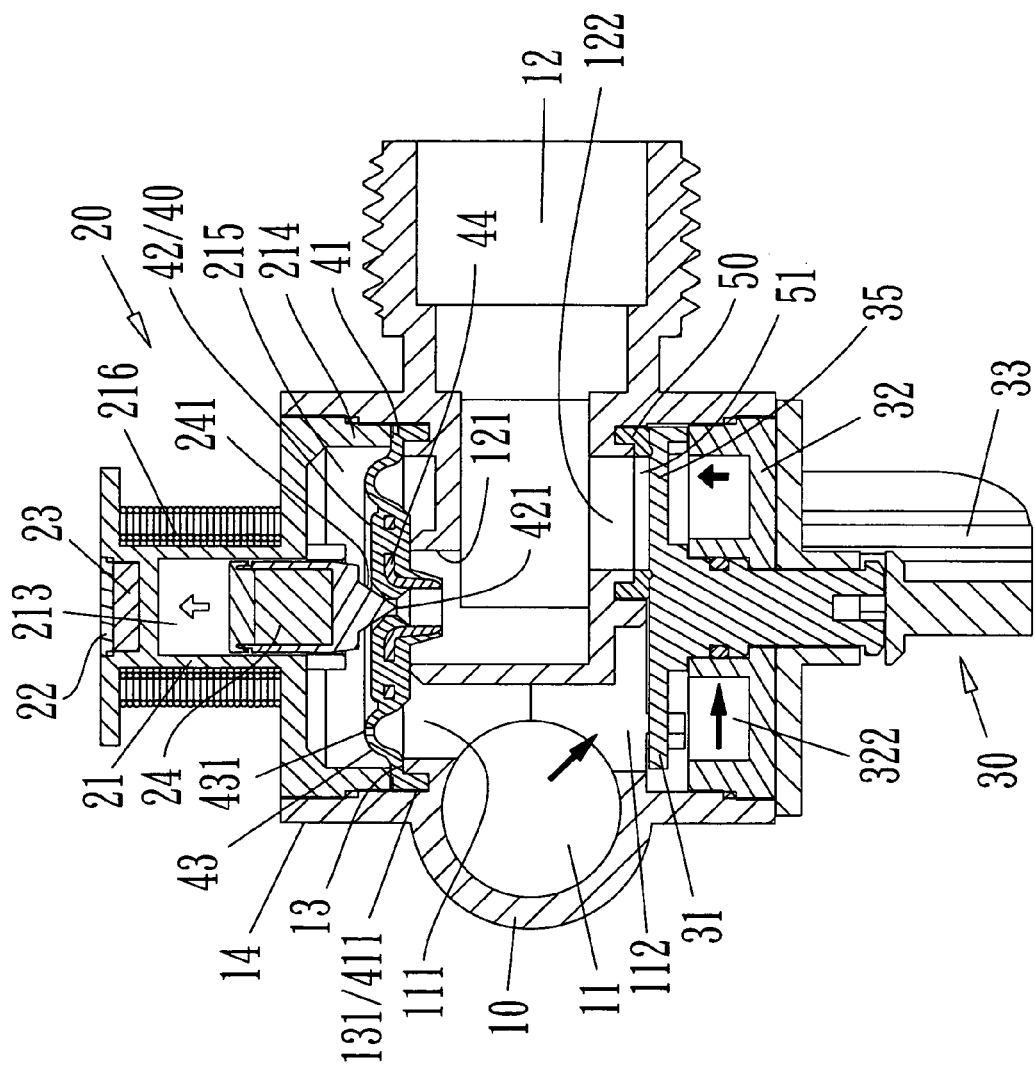
FIG. 15 is a C-C cross-sectional drawing according to FIG. 13.

Accordingly, as shown in FIG. 15, the magnetic control switch device 20 can be controlled by a switch (not shown in the figure) connected to the electromagnetic coil 216 to generate a magnetic field mutually repulsed with the magnetic field of an end of the valve rod 24. Furthermore, when the magnetic force is larger than the magnetic force of the valve rod 24 attracted by the magnetic attraction element 23, the valve rod 24 comes off the attraction of the magnetic attraction element 23 to instantly move toward an opposite direction so that a bottom of the valve rod 24 attaches to the upper end surface of the inner circular seat 42 of the first rubber ring 40 to allow the valve plug 241 to completely close the first valve 421 of the inner circular seat 42. The valve rod 24 is magnetically attracted by the metal plate 44 inside the inner circular seat 42 to enhance the closing effect between the valve plug 241 and the first valve 421. In the meantime, water flow is continuously introduced from the first water outlet 111 of the water inflow passage 11 into the inner containing chamber 215 through the piercing hole 431 of the flexible film 43 of the first rubber ring 40 so that water quantity within the inner containing chamber 215 is gradually increased until the inner circular seat 42 is pressed to close the first water inlet 121 so as to stop water.

Figure 16:
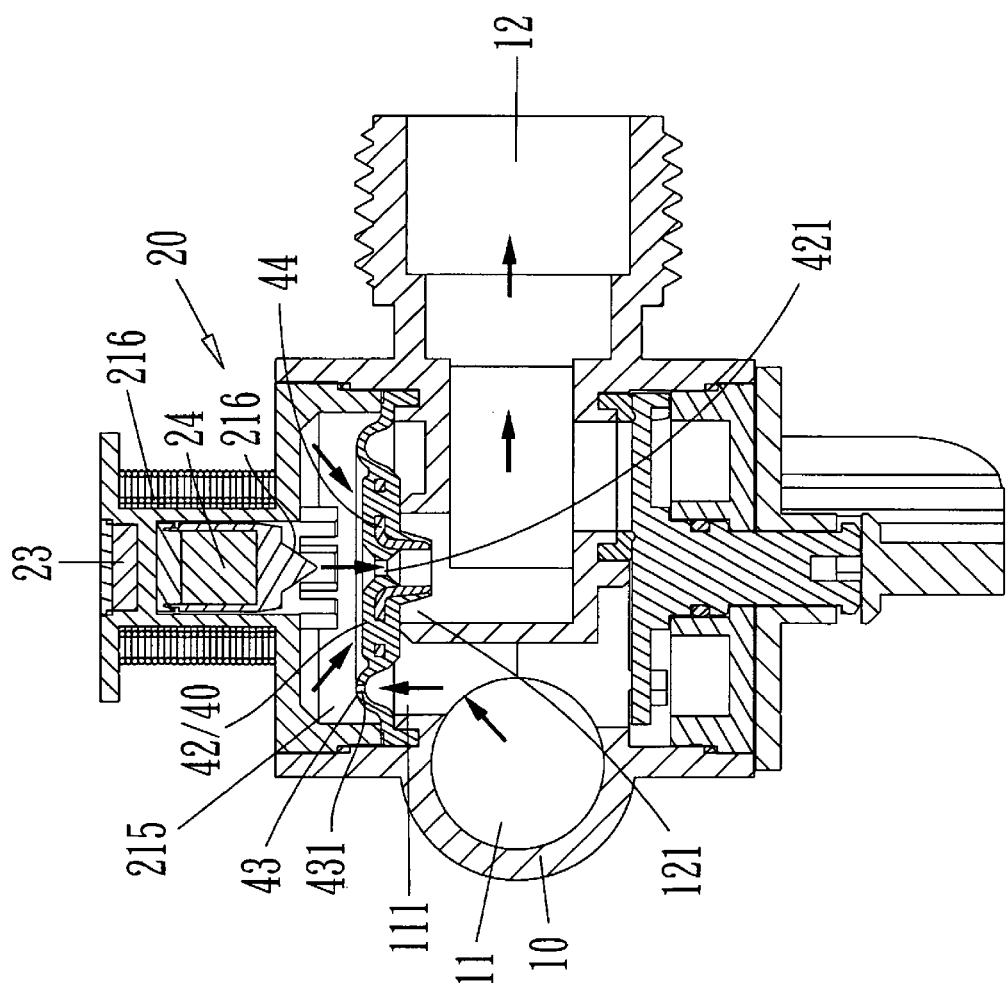
FIG. 16 is a movement diagram I according to FIG. 15.
Figure 17:
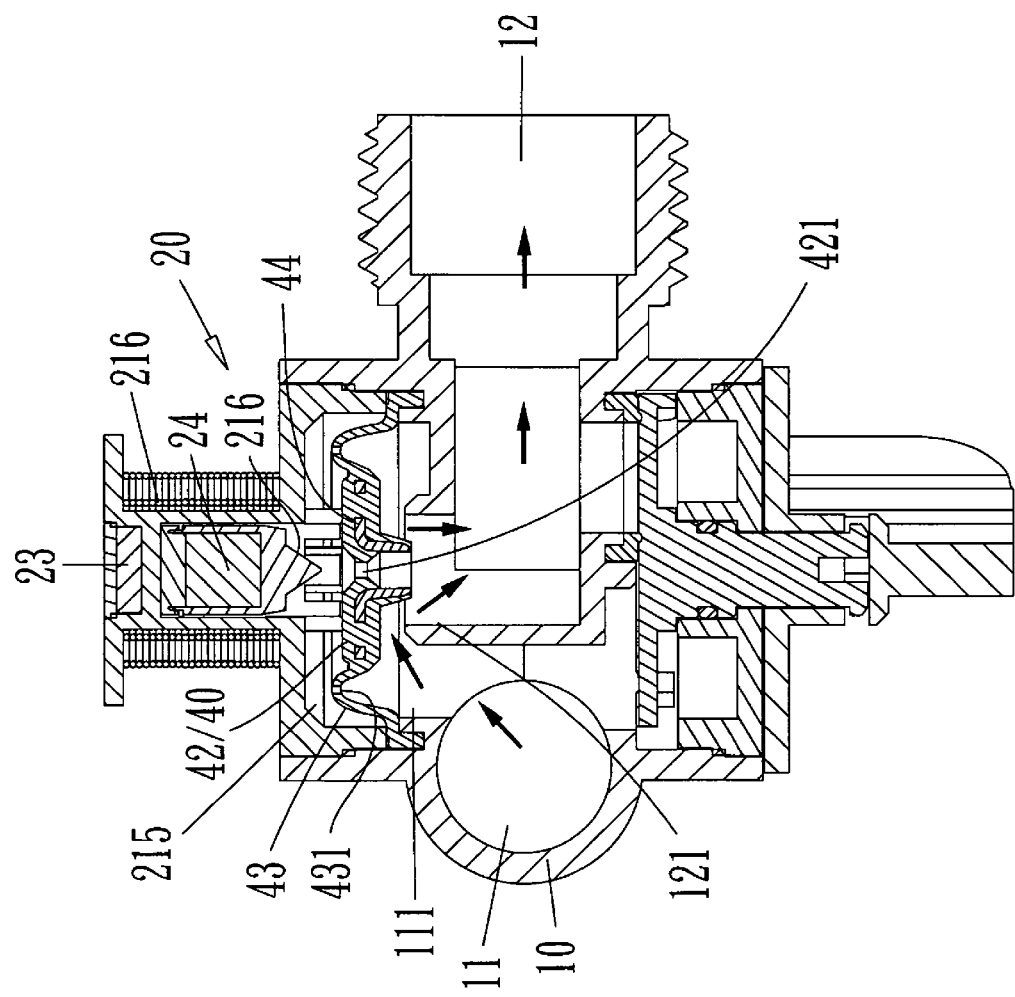
FIG. 17 is a movement diagram II according to FIG. 15.

As shown in FIG. 16 and FIG. 17, when the electromagnetic coil 216 controlled by the magnetic pole switch generates a magnetic field mutually attracted with an end of the valve rod 24 and when the magnetic force of the magnetic field is larger than the magnetic force generated by the valve rod 24 that is attracted to the metal plate 44, the valve rod 24 comes off the magnetic attraction effect of the metal plate 44 to instantly move toward an opposite direction so that one end of the valve rod 24 is attracted to the magnetic attracted member 23. The valve plug 241 of the valve rod 24 then totally comes off the first valve 421 of the inner circular seat 42 to allow the first valve 421 to show an opened state. Accordingly, water flow originally staying in the inner containing chamber 215 can be continuously introduced into the first water inlet 121 through the first valve 421, thereby draining away from the water outflow passage 12.

The first valve 421 of the inner circular seat 42 shows the opened state. Since a diameter width of the first valve 421 is larger than the hole diameter of the piercing hole 431, water flow within the inner containing chamber 215 is gradually reduced due to the water quantity drained from the first valve 421 which is larger than the water quantity introduced into the inner containing chamber 215 from the piercing hole 431 of the flexible film 43. Moreover, the inner circular seat 42 can be outwardly pushed by the water flow pushing at the first water outlet 111 so that an interval between the bottom of the inner circular seat 42 and the first water inlet 121 is exposed to massively introduce the water flow into the water outflow passage 12.

Figure 18:
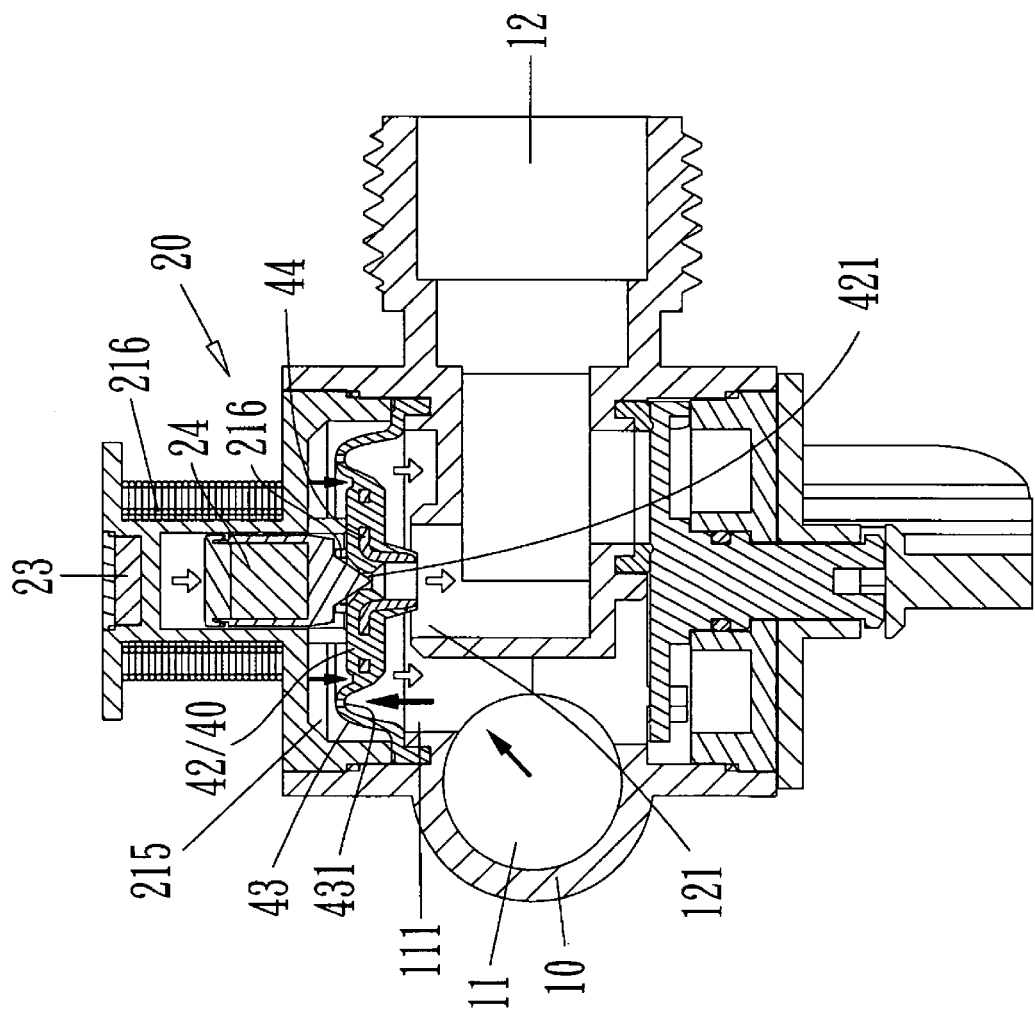
FIG. 18 is a movement diagram III according to FIG. 15.

As shown in FIG. 18, when the electromagnetic coil 216 controlled by a magnetic pole switch generates a magnetic field mutually repulsed with a magnetic pole of an end of the valve rod 24 and when the magnetic force of the magnetic field is larger than the magnetic force generated by the valve rod 24 attracted by the magnetic attraction element 23, the valve rod 24 comes off the attraction of the magnetic attraction element 23 to instantly move toward an opposite direction. On the one hand the bottom of the valve rod 24 leans against the corresponding end of the inner circular seat 42, and the metal plate 44 is closely attracted by the magnetic force generated by the valve rod 24 so allow the valve plug 24 to close the first valve 421, but one the other hand, the inner circular seat 42 is pushed by the valve rod 24 to close the first water inlet 121 to return to the close state shown in FIG. 15.

Figure 19:
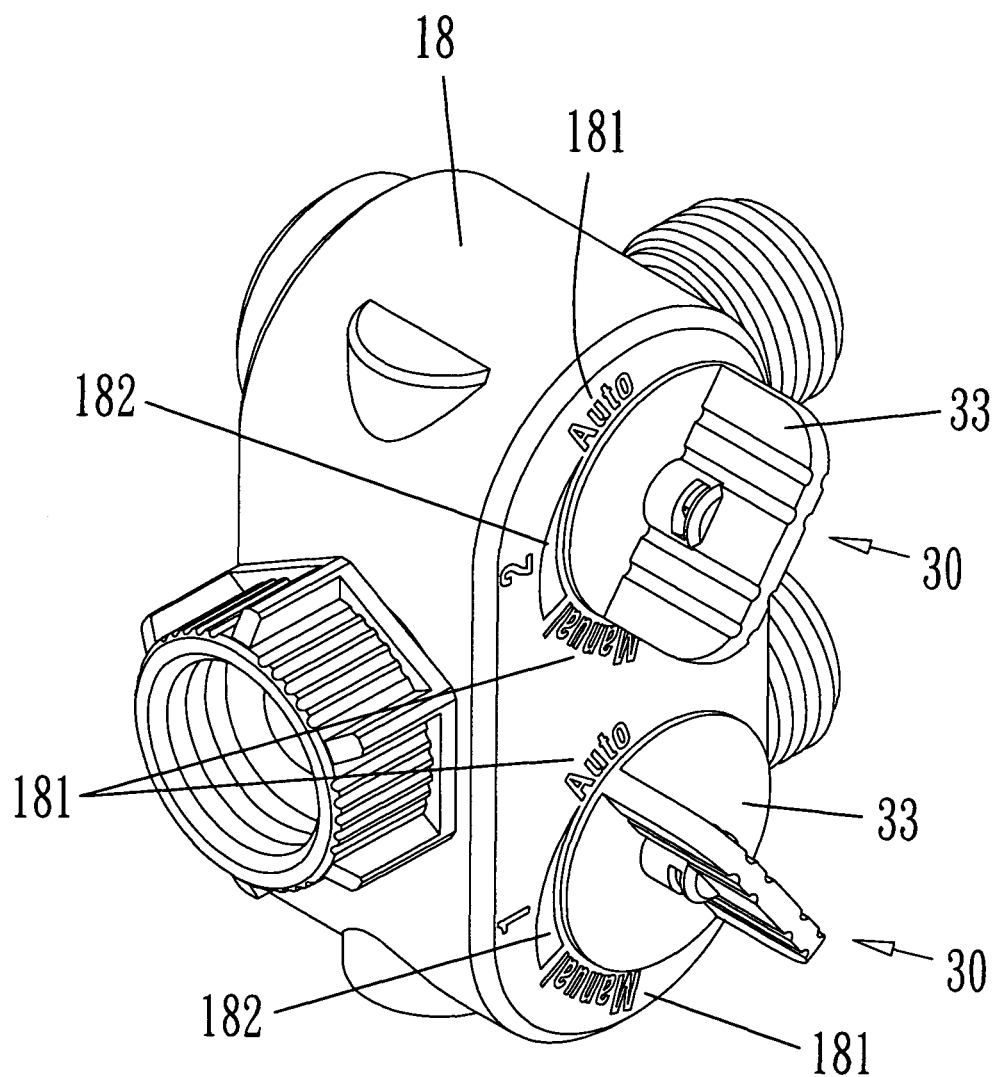
FIG. 19 is a schematic diagram of an external housing encapsulating an exterior portion of a valve rod according to a preferred embodiment of the present invention.

Further, as shown in FIG. 19, a schematic diagram of an external housing 18 encapsulating an exterior portion of the vale body 10 is depicted in accordance with a preferred embodiment of the present invention. The external housing 18 has text marks 181 for turn-on and turn-off and pattern marks 182 for controlling the quantity of water flow at peripheral end surfaces of the turning buttons 33 of the manual control switch devices 30 so that an operator can exactly recognize.

Although the features and advantages of the embodiments according to the preferred invention are disclosed, it is not limited to the embodiments described above, but encompasses any and all modifications and changes within the spirit and scope of the following claims.

What is claimed is:

1. A control switch for water conduit valve comprising: a valve body having a water inflow passage, the water inflow passage bifurcated to form more than one water outflow passage, the control switch characterized in that: a magnetic valve switch device and a manual control switch device disposed between the water inflow passage and the water outflow passage to provide a user to select controlling water flow that is introduced into the water outflow passage from the water inflow passage through the magnetic valve switch device or controlling water flow that is introduced into the water outflow passage through the manual control switch device or controlling a maximum water flow that is introduced into the water outflow passage through the magnetic valve switch device and the manual control switch device simultaneously, wherein the valve body respectively has a first water outlet and a first water inlet, and a second water outlet and a second water inlet between the water inflow passage and each water outflow passage, and a first rubber ring having a first valve and a magnetic control switch device are fit to the first water outlet and the first water inlet, and a second rubber ring having a second valve and a manual control switch device are fit to the second water outlet and the second water inlet, wherein the second water outlet of the valve body is disposed to a periphery of the second water inlet, and a concave ring is disposed to an external end of the second water inlet, and the second rubber ring having the second valve is fit to the concave ring, and a second inner baffle ring and a second circular seat are formed at a periphery of the second water outlet, and a limit block is disposed to a predetermined place of the second inner baffle ring, and the manual control switch device is connected to an inside of the second circular seat.

2. The control switch for water conduit valve as claimed in claim 1, wherein the manual control switch device comprises a rotary disc, wherein one end of the rotary disc is attached to corresponding ends of the second inner baffle ring and the second valve to close the second water outlet, the second water inlet and the second valve, and an inner concave arc is disposed to an external periphery of the rotary disc to contain the limit block, and a first piercing hole and a second piercing hole are disposed to a disc surface of the rotary disc, and the second piercing hole is rotated and regulated to align or stagger the second valve and the second water inlet, and an axis cylinder is axially disposed to the rotary disc, and the axis cylinder has an inner circular groove near the rotary disc, and a water stop ring is fit to the inner circular groove, and a turning button is fit at an end of the axis cylinder; and external cap for closing the second circular seat, wherein one end of the external cap is disposed with a circular frame, and a bottom of the circular frame is provided for leaning against and limiting the corresponding disc surface of the rotary disc, and a containing chamber is formed in the external cap, and an axle hole is axially disposed to the external cap and passed by the axis cylinder, and an inner frame ring is protruded at the axle hole, and an inner wall surface of the inner frame ring is in contact with a corresponding end of the water stop ring; and a turning button, wherein one end of the turning button is provided with a shape hole that is fit by an end of the axis cylinder of the rotary disc.

3. A control switch for a water conduit valve, comprising:
   a valve body having a water inflow passage, wherein said water inflow passage is bifurcated to form more than one water outflow passage, wherein a first water outlet and a first water inlet on the one hand, and a second water outlet and a second water inlet on the other hand are disposed between said water inflow passage and each water outflow passage; and
   a magnetic valve switch device which is connected to said first water outlet and said first water inlet and a manual control switch device which is connected to said second water outlet and said second water inlet are disposed between said water inflow passage and said water outflow passage to provide a user to select one of:
   controlling water flow that is introduced into said water outflow passage from said water inflow passage through said magnetic valve switch device,
   controlling water flow that is introduced into said water outflow passage through said manual control switch device, and
   controlling a maximum water flow that is introduced into said water outflow passage through said magnetic valve switch device and said manual control switch device simultaneously;
   wherein said valve body comprises a first rubber ring having a first valve and a magnetic control switch device which are fit to said first water outlet and said first water inlet, and a second rubber ring having a second valve and a manual control switch device which are fit to said second water outlet and said second water inlet, wherein said second water outlet of said valve body is disposed to a periphery of said second water inlet, and a concave ring is disposed to an external end of said second water inlet, and said second rubber ring having said second valve is fit to said concave ring, and a second inner baffle ring and a second circular seat are formed at a periphery of said second water outlet, and said manual control switch device is connected to an inside of said second circular seat.

4. The control switch for a water conduit valve, as recited in claim 3, wherein said first water outlet of said valve body is disposed to a periphery of said first water inlet, and a first inner baffle ring and a first circular seat that outwardly protrude are formed at a periphery of said first water outlet, and said first inner baffle ring is covered by a first rubber ring, and an inside of said first circular seat is connected to said magnetic control switch device.

5. The control switch for a water conduit valve, as recited in claim 3, wherein said first rubber ring comprises:
   an external circular seat,
   an inner circular seat,
   a flexible film connected between said external circular seat and said inner circular seat, wherein a bottom of said inner circular seat completely closes said first water inlet, wherein said first valve, which is axially disposed, is capable of conducting said water outflow passage, and
   a metal plate which is encapsulated inside said inner circular seat, wherein said first rubber ring has a piercing hole which is disposed to said flexible film, wherein a hole diameter of said piercing hole is smaller than an inner diameter of said first valve.

6. The control switch for a water conduit valve, as recited in claim 3, wherein said magnetic control switch device comprises a pipe seat having an independently external pipe body space and an inner pipe body space, wherein said pipe seat has an external frame extended from a bottom of said inner pipe body space, and an inner containing chamber is formed inside said external frame to communicate with said inner pipe body space, and an external portion of said pipe seat is wound by an electromagnetic coil, and said electromagnetic coil is connected to a magnetic pole switch that regulates an inside of said electromagnetic coil to generate a positive magnetic field or a negative magnetic field; an upper cap for closing said external pipe body space; a magnetic attraction element fit inside said external pipe body space; and a valve rod fit inside said inner pipe body space, wherein a bottom of said valve rod is provided with a valve plug for closing said first valve of said inner circular seat through regulation and displacement.

7. The control switch for a water conduit valve, as recited in claim 6, wherein said valve rod generates permanent magnetic force.

8. The control switch for a water conduit valve, as recited in claim 6, wherein said valve rod comprises a magnetic element for generating permanent magnetic force and a rubber sleeve pipe and a sealing cap for separately encapsulating external portions of said magnetic element, and said valve plug of said valve rod is disposed to an external bottom portion of a closing end of said rubber sleeve pipe.

9. A control switch for a water conduit valve, comprising:
   a valve body having a water inflow passage, wherein said water inflow passage is bifurcated to form more than one water outflow passage, wherein a first water outlet and a first water inlet on the one hand, and a second water outlet and a second water inlet on the other hand are disposed between said water inflow passage and each water outflow passage; and
   a magnetic valve switch device which is connected to said first water outlet and said first water inlet and a manual control switch device which is connected to said second water outlet and said second water inlet are disposed between said water inflow passage and said water outflow passage to provide a user to select one of:
   controlling water flow that is introduced into said water outflow passage from said water inflow passage through said magnetic valve switch device,
   controlling water flow that is introduced into said water outflow passage through said manual control switch device, and controlling a maximum water flow that is introduced into said water outflow passage through said magnetic valve switch device and said manual control switch device simultaneously;

wherein said valve body has a first rubber ring having a first valve and a magnetic control switch device which are fit to said first water outlet and said first water inlet, and a second rubber ring having a second valve and a manual control switch device which are fit to said second water outlet and said second water inlet;

wherein said second water outlet of said valve body is disposed to a periphery of said second water inlet, and a concave ring is disposed to an external end of said second water inlet, and said second rubber ring having said second valve is fit to said concave ring, and a second inner baffle ring and a second circular seat are formed at a periphery of said second water outlet, and a limit block is disposed to a predetermined place of said second inner baffle ring, and said manual control switch device is connected to an inside of said second circular seat.

10. The control switch for a water conduit valve, as recited in claim 9, wherein said manual control switch device comprises a rotary disc, wherein one end of said rotary disc is attached to corresponding ends of said second inner baffle ring and said second valve to close said second water outlet, said second water inlet and said second valve, and an inner concave arc is disposed to an external periphery of said rotary disc to contain said limit block, and a first piercing hole and a second piercing hole are disposed to a disc surface of said rotary disc, and said second piercing hole is rotated and regulated to align or stagger said second valve and said second water inlet, and an axis cylinder is axially disposed to said rotary disc, and said axis cylinder has an inner circular groove near said rotary disc, and a water stop ring is fit to said inner circular groove, and a turning button is fit at an end of said axis cylinder; an external cap for closing said second circular seat, wherein one end of said external cap is disposed with a circular frame, and a bottom of said circular frame is provided for leaning against and limiting said corresponding disc surface of said rotary disc, and a containing chamber is formed in said external cap, and an axle hole is axially disposed to said external cap and passed by said axis cylinder, and an inner frame ring is protruded at said axle hole, and an inner wall surface of said inner frame ring is in contact with a corresponding end of said water stop ring; and a turning button, wherein one end of said turning button is provided with a shape hole that is fit by an end of said axis cylinder of said rotary disc.

11. The control switch for a water conduit valve, as recited in claim 10, wherein an external housing encapsulates an exterior portion of a valve rod, and external housing has text marks for turn-on and turn-off and pattern marks for controlling a quantity of water flow at peripheral end surface of said turning button of said manual control switch device.

* * * * *